United States Patent [19]

Kobayashi et al.

[11] 4,215,032
[45] Jul. 29, 1980

[54] POLYESTER COMPOSITION

[75] Inventors: Shigeo Kobayashi; Nori Yoshihara; Kiyoji Nanbu; Yukio Goto, all of Otsu, Japan

[73] Assignee: Toyo Boseki Kabushiki Kaisha, Osaka, Japan

[21] Appl. No.: 37,334

[22] Filed: May 9, 1979

[30] Foreign Application Priority Data

May 18, 1978 [JP] Japan ................................. 53-59646

[51] Int. Cl.$^2$ ............................................... C08L 67/02
[52] U.S. Cl. ..................................... 260/40 R; 525/1; 525/437; 525/438
[58] Field of Search ........................... 525/1, 437, 438; 528/297; 260/40 R

[56] References Cited

U.S. PATENT DOCUMENTS

| 3,560,605 | 2/1971 | Siggel et al. ........................ 264/328 |
| 3,886,104 | 5/1975 | Borman et al. ................... 260/22 EP |
| 4,016,142 | 4/1977 | Alexander et al. ................. 260/75 T |
| 4,065,438 | 12/1977 | Verborgt ............................ 260/75 R |
| 4,076,767 | 2/1978 | Sam ejima ............................ 260/862 |
| 4,147,737 | 4/1979 | Sein et al. ............................ 260/835 |

*Primary Examiner*—Earl A. Nielsen
*Attorney, Agent, or Firm*—Wenderoth, Lind & Ponack

[57] ABSTRACT

The present application provides a polyester composition composed of polyethylene terephthalate or a polyester containing at least 80 mol % of ethylene terephthalate repeating units and 0.1 to 15 weight %, based on the polyester, of an organic crystallization promoting agent having a polyoxyalkylene chain and at least one epoxy group. The latter promoting agents are represented by such materials as a glycidyl ether of a polyalkylene glycol having a molecular weight less than 5000. Such crystallization promoting agents serve to prevent streaks and pock marks on the surface of articles molded from such polyester compositions.

16 Claims, No Drawings

POLYESTER COMPOSITION

BACKGROUND OF THE INVENTION

The present invention relates to polyester compositions for molding materials, and especially to polyester compositions suitable for low-temperature molding materials. More particularly, the invention is concerned with novel polyester compositions which exhibit excellent moldability when molded at low mold temperatures lower than 100° C. and which at the same time provide molded articles with excellent surface characteristics and physical properties.

DISCUSSION OF THE PRIOR ART

Polyethylene terephthalate is used for many industrial products such as fibers and films because of its excellent resistance to heat, resistance to chemicals, mechanical and electrical properties. However, when it is used in the field of plastics to produce injection molded articles, many shortcomings are observed upon molding, owing to its particular crystallizing behavior. That is to say, polyethylene terephthalate is a crystalline polymer in itself, but because of its high second order transition temperature, when it is molded especially at a low mold temperature lower than 100° C. at which it is usually molded by general molding machines for universally used thermoplastic resins, the shape stability of molded articles at temperatures above its second order transition temperature becomes extremely bad. Furthermore, in addition to its requiring a long residence time in molds and its showing a poor mold releasability, it has a further disadvantage of generating pockmarks and/or streaks on the surface of the molded articles obtained. To remedy such shortcomings, it is necessary to shift the crystallization initiating temperature of polyethylene terephthalate to the lower temperature side and to increase the crystallization speed, so that the crystallization can be sufficiently promoted to the surface layer of molded articles. To increase the crystallization speed, it has been common practice to add a crystal nucleus forming agent, especially an inorganic filler such as talc or titanium oxide, in an amount of about 0.5 to 1 weight %. However, the addition of such an inorganic filler produces a greatly different effect as a crystal nucleus forming agent, depending on its particle diameter distribution and/or uniform dispersibility, and moreover even an increased amount of addition does not produce a satisfactory effect. Particularly, it is difficult to shift the crystallization initiating temperature to the lower temperature side, and the crystallization of the surface layer of molded articles formed in a low-temperature mold is utterly insufficient. Also, compositions to which metal salts of mono- or polycarboxylic acids have been added to promote the crystallization are known from Japanese Patent Publication Nos. 4097/1972; 14502/1972, etc.; and compositions which combine both the above-mentioned fillers and metal salts of carboxylic acids are known from Japanese Patent Publication No. 32435/1972, etc. However, from any of these compositions, it is impossible to obtain molded articles having a high surface layer crystallinity and excellent mold releasability and physical properties by by molding in low-temperature molds at temperature lower than 100° C.

SUMMARY OF THE INVENTION

An object of the present invention is therefore to provide polyester compositions improved in the crystallinity properties of polyethylene terephthalate.

Another object of the invention is to provide polyester compositions which exhibit, at low mold temperatures lower than 100° C., excellent moldability, i.e. a short molding cycle, excellent surface characteristics and good mold releasability, and which can give molded articles free from the generation of streaks and having a good surface luster by molding in low-temperature molds using injection molding machines for universal use.

A further object of the invention is to provide polyester compositions which can give molded articles having excellent physical properties even by molding in low-temperature molds.

A still further object is to provide polyester compositions which, even by molding in low-temperature molds, can give molded articles having a small thermal shrinkage and heat deformation at temperatures above the second order transition temperature and having a high deflection temperature and excellent heat resistance.

Other object and effects of the present invention will become apparent from the following detailed description.

DETAILED DESCRIPTION OF THE INVENTION

We have researched intensively to shift the crystallization initiating temperature of polyethylene terephthalate to the lower temperature side and to increase the crystallization speed. As a result, it has been found effective to activate the mobility of the glycol portions of polyethylene terephthalate. This discovery led us to the present invention. Briefly stated, the present invention is a polyester composition composed of polyethylene terephthalate or a polyester containing at least 80 mol % ethylene terephthalate repeating units, and 0.1 to 15 weight %, based on the polyester, of an organic crystallization promoting agent added thereto having a polyoxyalkylene chain and at least one epoxy group.

The composition of the present invention has an excellent crystallization speed and can give injection molded articles having a high degree of crystallinity and excellent surface luster even in a short resisdence time in molds. Also, in addition to the fact that the composition is excellent in mold releasability and surface characteristics even when molded in low-temperature molds, it has an advantage that the shape stability of molded articles formed in low-temperature molds is excellent at temperatures above the second order transition temperature.

While we do not fully understand why the specific compounds according to the present invention have an excellent crystallization promoting effect, a possible supposition may be as follows: The mobility of the glycol portions of polyethylene terephthalate is activated by the polyoxyalkylene chain of the specific compound which is an additive having a low second order transition temperature. Furthermore, the epoxy groups of the additive and the terminal groups of polyethylene terephthalate react at least partly. This improves the dispersibility of said additive and various other additives (which will be mentioned hereinafter) and at the same time causes the molecular orientation of polyethylene terephthalate in the mold upon injection molding by a partial cross-linking reaction which gives a low cross-linking density. By these two effects, it is supposed that the crystallization is promoted uniformly and effectively. Accordingly, the excellent crystallization promoting effect is closely related with the length of the polyoxyalkylene chain and the density of the epoxy groups. Anyhow, it is really surprising that the specific compounds of the present invention have a marked effect in comparison with polyalkylene glycol having no epoxy group or ethylene glycol diglycidyl ether which is short chained though having epoxy groups.

The polyesters used in the present invention include polyethylene terephthalate and copolymer polyesters containing at least 80 mol %, preferably more than 90 mol %, of ethylene terephthalate repeating units. As the copolymerization components, known acid components and/or glycol components can be used. Namely, the copolymerization components include acid components such as isophthalic acid, naphthalene 1,4-or 2,6-dicarboxylic acid, diphenyl ether 4,4'-dicarboxylic acid, adipic acid, sebacic acid, etc.; glycol components such as propylene glycol, butylene glycol, diethylene glycol, neopentyl glycol, cyclohexane dimethanol, 2,2-bis(4-hydroxyphenyl) propane, etc.; oxyacids such as p-oxybenzoic acid, p-hydroxyethoxybenzoic acd, etc. The polyesters preferably have an intrinsic viscosity higher than 0.5, and more preferably, higher than 0.55, as measured in a mixed solvent of phenol and tetrachloroethane in the ratio of 6:4 by weight at 30° C. Of course, the above-mentioned polyethylene terephthalate and copolymer polyesters may be used in combination.

As the organic crystallization promoting agent used in the present invention containing a polyoxyalkylene chain and at least one epoxy group, it is preferable to employ a compound containing a polyalkylene chain and at least one epoxy group in the same molecule, but it is also possible to employ two compounds in combination which can form a compound containing a polyoxyalkylene chain and at least one epoxy group by the reaction caused upon compounding or molding. Such compounds containing a polyoxyalkylene chain and at least one epoxy group in the same molecule are epoxy compounds of polyalkylene glycol or its derivatives. As such epoxy compounds which are preferable, there may be mentioned polyalkylene glycol glycidyl ethers represented by the general formula:

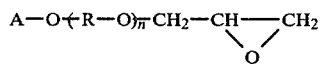

wherein A stands for a $C_1$–$C_5$ aliphatic hydrocarbon group, hydrogen, or a glycidyl group; R stands for a $C_2$–$C_5$ aliphatic hydrocarbon group; and n stands for an integer not smaller than 2. As concrete examples, there may be mentioned mono- or diglycidyl ether of polyesterglycol; mono- or diglycidyl ether of polypropylene glycol; mono- or diglycidyl ether of polytetramethylene glycol; mono- or diglycidyl ether of polyneopentyl glycol; mono- or diglycidyl ether of a copolymer of polyethylene glycol/polypropylene glycol; mono- or diglycidyl ether of a copolymer of polyethylene glycol/polytetramethylene glycol; monoglycidyl ether of methoxypolyethylene glycol; mono-glycidyl ether of ethoxypolypropylene glycol; etc. Besides those included in the above-mentioned general foumula, there may be mentioned as preferred compounds: mono- or polyglycidyl ether of an addition product of a polyvalent alcohol/alkylene oxide such as mono- or polyglycidyl ether of an addition product of glycerin/alkylene oxide; glycidyl ether of an addition product of neopentyl glycol/alkylene oxide; etc. However, the organic crystallization promoting agents are not limited to those mentioned above. It is preferable that the molecular weight of polyalkylene glycol or its derivative should be below 5000, more preferably from 150 to 3000, and most preferably from 200 to 1500. With too high a molecular weight, the compatibility with the polyester is lowered and the crystallization promoting effect is lost. As the organic crystallization promoting agents, particularly preferred are polyglycidyl ether compounds containing more than 1.2 epoxy groups on the average in one molecule. As regards the epoxy value (equivalent number of epoxide oxygen present in 100 g compound), a value about 0.1 to 0.7 is preferable. The amount of addition of the organic crystallization promoting agent is varied depending on the mold temperature, the amount of addition of inorganic fillers, etc., but it is generally 0.1 to 15 weight %, preferably 0.5 to 15 weight %, and more preferably 1 to 10 weight %, based on the weight of the polyester used. Particularly in the case of molding in low-temperature molds, it is desirable that the amount should be more than 1 weight %.

To obtain a compound that can form an organic crystallization promoting agent during the molding process, there may be used a polyoxyalkylene compound, such as polyalkylene glycol, having active hydrogen at its terminal, in combination with a polyepoxy compound. In such a case, it is preferable to use a catalyst in combination to promote the reactivity of the two compounds. Preferably, the mixing ratio of the two compounds is such that an epoxy value of 0.1 to 0.7 can be obtained.

In the present invention, when an inorganic filler is used in combination, the crystallization speed is further accelerated by a synergetic effect with the organic crystallization promoting agent used. The inorganic fillers used in the present invention include, for example, silicates such as talc (main component $3MgO.4SiO_2.nH_2O$), clay (main component $Al_2O_3.2SiO_2.2H_2O$), kaolin (main component $Al_2O_3.2SiO_2.2H_2O$), mica (alminosilicate containing alkali metals, main component $2K_2O.3Al_2O_3.6SiO_2.2H_2O$), asbestos (main component $3MgO.2SiO_2.2H_2O$), calcium silicate; silica; gypsum; etc. These are used singly or as a mixture. Among these fillers, particularly preferred are silicates. These inorganic fillers have an average particle diameter of less than $30\mu$, preferably less than $10\mu$. As for calcium silicate and silica, those having an average particle diameter less than 500 m$\mu$ are preferred.

For a composition to mold especially thin molded articles, it is preferable to use an inorganic filler in the form of fine particles having a particle diameter less than 500 m$\mu$ in combination with an inorganic filler having a particle diameter between $30\mu$ and 500 m$\mu$, from the viewpoint of moldability and dimensional stability under heat. The amount of addition of such a mixture is usually 0 to 40 weight %, preferably 1 to 30 weight %, based on the total composition. To promote the crystallization, a relatively small amount is sufficient, but when dimensional stability and heat resistance are taken into consideration, the amount is preferably 5 to 30 weight %. By adding an inorganic filler, the amount of addition of the organic crystallization promoting agent can be reduced. An amount of addition of the inorganic filler exceeding 40 weight % not only lowers the fluidity upon molding, the breaking elongation of molded articles and the toughness of the products, but also impairs the surface characteristics of the molded products.

By further addition of an elastic resin of the polyester family having a second order transition temperature below 10° C. to the composition of the present invention, it is possible to enhance the dispersibility of the organic crystallization promoting agent and further to promote the crystallization. As the elastic resins of the polyester family used herein having a glass transition temperature below 10° C., there may be mentioned aromatic polyester/polyether elastic resins whose soft segments are polyalkylene glycol residues such as polytetramethylene glycol, polyethylene glycol, polyethylene glycol/polypropylene glycol block copolymers, polyvalent alcohol/alkylene oxide addition products, etc., and whose hard segments are aromatic polyester residues such as polyethylene terephthalate, polybutylene terephthalate, polyethylene terephthalate/isophthalate, polyethylene para-oxybenzoate, polyethylene terephthalate/adipate, polyethylene terephthalate/sebacate, polyethylene naphthalate, polybutylene terephthalate/adipate, polybutylene terephthalate/isophthalate, polybutylene terephthalate/ethylene terephthalate, etc. Said elastic resins are aromatic polyester/polyalkylene glycol block components whose glass transition temperature is normally less than 10° C., preferably −15° C. to −60° C.; whose molecular weight is more than 10,000, preferably more than 30,000; whose polyalkylene glycol has a molecular weight above 650, preferably 800 to 6,000; and whose polyalkylene glycol portion constitutes more than 20 weight %, preferably 20 to 80 weight %. As other elastic resins of the polyester family that can be used herein, there may be mentioned: copolymer polyester elastic resins having a molecular weight above 10,000, whose soft segments are aliphatic residues such as polyalkylene adipate, polyalkylene sebacate, etc., and whose hard segments are above-mentioned aromatic polyester residues; and copolymer polyester elastic resins having a molecular weight above 10,000, which can be obtained by copolycondensing an aromatic dicarboxylic acid such as terephthalic acid, naphthalene dicarboxylic acid, etc., or an aliphatic dicarboxylic acid such as adipic acid, sebacic acid, etc. as the acid component, and a straight chain glycol such as ethylene glycol, butylene glycol, etc., or a branched glycol such as neopentyl glycol, as the alcoholic component. However, those that are preferable from the viewpoint of the uniformity and easiness of blending, crystallization promoting effect and surface characteristics (external appearance, etc.), are the above-mentioned aromatic polyester/polyether block copolymer elastic resins, particularly aromatic polyester/polytetramethylene glycol block copolymer elastic resins, and among others polybutylene terephthalate/polytetramethylene glycol block copolymer elastic resin. The amount of addition of such an elastic resin is preferably 0.2 to 20 weight % based on polyethylene terephthalate or other main polyesters. As an auxiliary dispersing agent for the organic crystallization promoting agents, a large amount of addition of such an elastic resin is possible, but an addition amount exceeding 20 weight % gives rise to a serious drop of the deflection temperature of the polyester. The particularly preferred amount of addition is from 1 to 10 weight %.

In the present invention, it is also possible to add a fibrous reinforcing material for main purposes of further elevating the deflection temperature and the dimensional stability under heat. The fibrous reinforcing material that can be used include carbon fibers, graphite fibers; metal carbide fibers or metal nitride fibers such as silicon carbide fibers, silicon nitride fibers, boron carbide fibers; glass fibers; heat-resisting organic fibers, etc. Among these fibers, glass fibers are particularly preferable. Said glass fibers may be the ordinary glass fibers used for reinforced plastics. Preferably, the diameter is 3 to 30μ. Depending on the method of production, various forms of fibers such as rovings, chopped strands, etc. can be use. Among such glass fibers, those that have been treated, for example, silane-treated, chrome-treated, etc., to improve the adhesive force to plastics, are preferable. The amount of addition of such fibers is 0 to 50 weight %, preferably 5 to 40 weight %, based on the total amount of resin. The addition of the fibrous reinforcing material further improves the surface characteristics and markedly elevates the deflection temperature. In addition to these improvements, it is possible to improve the dimensional stability under heat, in a high-temperature atmosphere above 100° C., of molded articles formed in low-temperature molds. Such molded articles can be used as heat-resisting engineering plastics.

In the case of the compositions of the present invention, when the total amount of addition of inorganic filler and fibrous reinforcing material is 10 to 60 weight %, pariculary 15 to 50 weight %, based on the total composition, a high deflection temperature and an extremely good dimensional stability under heat can be obtained, the latter even in the case of molded articles obtained by molding in low-temperature molds below 100° C. When the total amount of addition exceeds 60 weight %, the fluidity upon molding and the surface characteristic of molded articles become inferior, and at the same time the breaking elongation is lowered and the toughness of molded articles is reduced.

When the composition of the present invention is used in combination with a mold releasing agent, a synergetic effect is caused together with the organic crystallization promoting agent, by which effect the moldability is further improved, so that it is possible to obtain molded articles with very good surface characteristics even by low-temperature molding. As the mold releasing agents used herein that are preferable include esters of a $C_{15}$–$C_{50}$ fatty acid and an alcohol; salts of said fatty acid and a metal of IA Group or IIA Group of the Periodic Table of the Elements; and mixtures of these. For example, there may be mentioned metal salts of stearic acid such as sodium stearate, magnecium stearate, calcium stearate, etc.; and metal salts of montanic acid such as sodium montanate, calcium montanate, etc. These can be used singly or as a mixture of two or more of these. The amount of addition of the mold releasing agent is generally 0 to 3 weight %, based on the polyester. Above all, metal salts of fatty acids have also an action and effect as reaction promoting agents for epoxy compounds. Accordingly, when an active hydrogen-containing polyoxyalkylene compound is used in combination with a polyepoxy compound to form an organic crystallization promoting agent, it is particularly preferable to add a fatty acid metal salt.

The present invention stands on a completely different ground from the conventional, general thought on the molding of polyethylene terephthalate that the molding cycle should be as short as possible while using a high mold temperature such as 140° C. Namely, the invention is intended to obtain molding materials with excellent moldability and surface characteristics even under molding conditions at a low mold temperature similar to that of other engineering plastics such as nylon, polycarbonate, polyacetal, etc. This object can be attained by adding a suitable amount of the organic crystallization promoting agents of the present invention, while on the other hand it is completely impossible to produce polyethylene terephthalate molding materials with excellent moldability and surface characteristics by low-temperature molding using conventional, known crystallization promoting agents. Also, by adding the inorganic filler and fibrous reinforcing agent, the moldability is further improved, and in additon, even by molding in low-temperature molds, it is possible to obtain molded articles having excellent heat resisting properties, namely a small amount of heat deflection and a small percent thermal shrinkage at high temperatures. Moreover, by the addition of the mold releasing agent, it is possible to further improve the moldability. It goes without saying that this composition can be molded at a high mold temperature of 140° C. as in the conventional method. In this case, since the crystallization speed is accelerated to a further extent, the molding cycle is shortened and therefore the molding efficiency is elevated.

To the compositions of the present invention, there may be added stabilizers for the polyester, such as antioxidants, ultraviolet ray absorbants; and other additives such as plasticizers, lubricants, flame retardants, antistatic agents, coloring agents, antifungal agent, foaming agents, etc., depending on the uses and purposes.

As the flame retardants, there may be mentioned compounds containing halogen or phosphorus, for example, organic halogen compounds, organic phosphorus compounds, etc., and compounds of metals of Vb Group of the Periodic Table of the Elements, for example, antimony trioxide, are used as auxiliary agents for flame retardants. Particularly preferred flame retardants as viewed from the color tone, physical properties and flame retardancy of molded products are carbonates of halogenated bisphenol or their oligomers as disclosed in U.S. Pat. No. 3,833,685; and oligomers obtained by reacting halogenated triazine with halogenated bisphenol, and if desired a monohydric phenol or monohydric alcohol (terminal stopper). The carbonates of halogenated bisphenol or their oligomers are represented by the following formula (I):

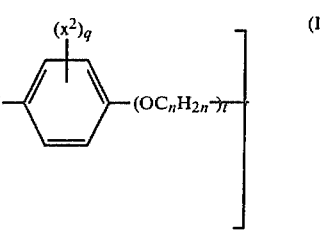

wherein $x^1$ and $x^2$ each stand for a bromine atom or chlorine atom; p and q each stand for an integer from 1 to 4; n stands for an integer from 2 to 4; r and t each stand for 0 or an integer from 1 to 20; Y stands for an alkylene group, alkylidene group, —O—, —CO—, —S—, —SO—, —SO$_2$, or —(the direct connection of the two benzene rings). Those preferred are oligomers having an average degree of polymerization of from 2 to 30. In the formula (I), any organic group, for example, phenyl, substituted phenyl, alkyl, etc. can be the terminal group. The oligomers obtained by the reaction of halogenated triazine with halogenated bisphenol are represented by the following formula (II):

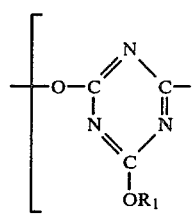

where $x^1$, $x^2$, p, q, n, r, t, and Y are each of the same meaning as in the formula (I); R$_1$ stands for a halogen atom, a lower alkyl group, a halogenated lower alkyl group, a phenyl group, a halogenated phenyl group, etc. Those preferred are oligomers having an average degree of polymerization of from 2 to 30. In the formula (II), the terminal group can be any of the same groups as in the formula (I). The organic crystallization promoting agents of the present invention can improve the dispersibility of the flame retardants into the polyesters and can give reproducible flame retardancy. The amount of addition of the flame retardants is 2 to 50 weight %, preferably 5 to 30 weight %, based on the total amount of the resin. The amount of addition of the flame retardant auxiliary agents is usually less than 50 weight %, preferably 10 to 40 weight %, based on the flame retardants, and preferably less than 10 weight % based on the total amount of the resin.

To the composition of the present invention, there may be added a polyamide and or a rubber-like elastic substance to improve the impact resistance. As such rubber-like elastic substances, there can be mentioned those having a glass transition temperature below 0° C., preferably below −20° C., which are incompatible with the polyester and can be dispersed as a finely dispersed phase into the polyester. Preferred rubber-like elastic substances are copolymers composed of a 30 to 95 weight % ethylene component and a 70 to 5 weight % ethylenic unsaturated monomer component, or partially saponified products of such copolymers. Said copolymers can be further copolymerized or graft-copolymerized with a monomer having a functional group, such as acrylic acid, methacrylic acid, glycidyl methacrylate, hydroxyalkyl acrylate, etc. The organic crystallization promoting agents of the present invention improve the dispersibility of the impact resistance-improved polymers into the polyester, and also elevate the interfacial adhesive force between the impact resistance-improved polymers and polyesters, so that the toughness can be further heightened. Moreover, the addition of said polymers improves the strength of welded portions of molded articles. The amount of addition is usually below 30 wt. %, preferably 1 to 20 wt. % based on the total amount of the resin.

The processes for the production of the polyester compositions of the present invention are not particularly limited and can be performed in any way. Examples of such processes are: a process wherein the polyester and other components are mixed beforehand and the mixture is fed into an extruder, in which it is molten and mixed; a process wherein the polyester and other components except the fibrous reinforcing material are mixed previously and the mixture is put into an extruder. The melt is then put around a glass roving, for example, to cool it, and after cooling, it is cut into a suitable length (the so-called "wire covering process"); a process wherein the fibrous reinforcing material or the inorganic filler is added to the polyester during or after the polymerization step, and then all other components are added; a process wherein the polyester, inorganic filler, fibrous reinforcing material and organic crystallization promoting agent are mixed, and the mold releasing agent is added upon molding; a process wherein after polymerization of the polyester, the organic crystallization promoting agent is added to introduce a part of it as a terminal group of the polyester, and then other additives are added; a process wherein any several components are kneaded together to form pellets, and other components are molten and kneaded together with the pellets; a process wherein the polyester is divided into portions and these portions are mixed with various different additives separately to form pellets of different components and then the pellets are melted and kneaded, etc. However, the process of mixing and the time of addition are not limited to the above-mentioned.

In the present invention, it is easily possible to obtain a polyester composition, whose molded article formed at a mold temperature below 100° C., especially between 85° and 90° C., gives a surface layer crystallinity (which will be described hereinafter) above 0.5. However, particularly preferred compositions are those that give a surface layer crystallinity above 0.7. The surface layer crystallinity (A) is a factor which can express the crystallizing properties of the surface layer of a molded article. When polyethylene terephthalate is molded at a mold temperature below 100° C., the surface layer of the molded article is nearly transparent and the value of (A) is below about 0.15. On the other hand, when the sample is heat-treated at 150° C. for one hour, the crystallization proceeds almost completely and the value (A) increases to 1.05. Thus, the low-crystalline molded article turns into a high-crystalline article by heat-treatment, but, since such an article are deformed by heat, it becomes entirely unsuitable as a molded article. To remedy such a defect, the present invention provides polyester compositions which give molded articles having a high surface-layer crystallinity without heat treatment after low-temperature molding.

In the case of the molded articles obtained from the compositions of the present invention, the crystallization proceeds sufficiently under the general molding conditions, and the molded articles hold excellent dimensional stability under heat and mechanical properties. Therefore, the compositions of the present invention can be widely utilized for the molding of various molded parts, sheets, tubes, laminates, containers, etc., but when the excellent resistance to electricity is taken into account, the compositions are particularly suitable for the molding of electric parts, car parts, etc.

The invention will be explained hereinafter by examples, in which % means weight % unless otherwise indicated. The molding of test pieces and various evaluations of molded articles in the examples were carried out in accordance with the following methods:

(1) Molding of test pieces

Prescribed amounts of polyethylene terephthalate (intrinsic viscosity 0.60; melting point 264° C.) and additives are weighed, and the components are mixed in a tumbling blender. Then, unless otherwise indicated, the mixture is put into the hopper of a 40 mm diameter vent-type extruder, and is molten and kneaded at cylinder temperatures of 250°–275°–280° C. (the temperatures are indicated from the hopper side in order) to produce compounded chips of the components. The compounded chips are dried under reduced pressure at a temperature of 120° C. for 4 hours and the dried chips are molded into test pieces by an injection molding machine. The molding machine used is of Nippon Seikosho-Ankerberg N-95 type. The molding conditions are:

cylinder temperatures 280°—280°–275° C.,
mold temperature 85° or 90° C.,
injection pressure holding time 15 seconds,
cooling time 15 seconds, and
injection pressure 300–600 kg/cm².

(2) Deflection temperature

The deflection temperature is measured in accordance with ASTM D-648, with a test piece thickness of ⅛ inch under a load of 18.6 kg/cm².

(3) Deflection amount at 120° C. ($\delta_{120}$)

In accordance with the deflection temperature measuring method, with the test piece thickness of ⅛ inch and under the load of 18.6 kg/cm², the test piece is heated to 120° C. and the deflection amount at this temperature is measured in mm.

(4) Percent thermal shrinkage

A disc with a diameter of 100 mm and a thickness of 3 mm is molded. Taking that the length at the angle of 45° against the side gate is $l_o$, and the length after a heat treatment at 150° or 160° C. for one hour in a gear oven is l, the percent thermal shrinkage is calculated by the following formula:

$$\text{Percent thermal shrinkage} = \frac{l_o - l}{l_o} \times 100$$

(5) Mold releasability and surface characteristics of molded articles

The mold releasability is judged from the releasing easiness or difficulty of a molded disc, 100 mm in diameter and 3 mm in thickness, or of a molded spool. The surface characteristics are judged from the surface luster and streaks of the disc.

◎ Very good, ○ Good, △ Fairly good, × Bad, ×× Very bad.

(6) Surface-layer crystallinity from IR spectrum

A test piece (40×18 mm) is cut out from the above-mentioned disc. By a total reflection IR spectrum analyzer (Hitachi Ltd.; type no. 285), an IR absorption spectrum is taken. From the crystal absorption band at 1335 cm$^{-1}$ (I) and the correction band at 1405 cm$^{-1}$ ($I_o$), the surface-layer crystallinity (A) of the molded article is obtained by the following formula:

$$A = \log\left(\frac{I}{I_o}\right)$$

(7) Tensile strength and elongation

ASTM D-638

(8) Flexural strength

ASTM D-790

(9) Dropping weight impact strength

The dropping weight impact strength is expressed by the energy value observed when a crack is generated in an injection molded article of a thickness of 3 mm by an extremity radius of 6.3 mm.

(10) Flame retardancy

A molded piece of 1/16×½×5 inches is tested for the flame retardancy in accordance with the testing method UL-94 (described in Underwriters Labo. Inc. Bulletin U-94).

(11) Percent water absorption

A molded disc, 100 mm in diameter and 3 mm in thickness, is immersed in water at 23° C. for three days. The percent water absorption is obtained from the following formula:

Water absorption (%) =

$$\frac{\text{(Weight after treatment)} - \text{(Weight before treatment)}}{\text{(Weight before treatment)}} \times 100$$

EXAMPLE 1

Polyethylene terephthalate, chopped glass strands, 3 mm in length (Glasslon Chopped Strands 486 A; Asahi Fiber Glass Co.), talc, 10μ in average particle diameter (Talcum Powder PK, Hayashi Kasei Co.), calcium silicate, 50 mμ in average diameter (Silmos T, Shiraishi Calcium Co.) and organic crystallization promoting agents were mixed in the proportions shown in Table 1, and the mixture was molded at a mold temperature of 85° C. to form disc-shaped test pieces. The molded articles thus obtained were tested for the mold releasability, surface characteristics, deflection temperature, heat deflection amount and percent thermal shrinkage. The results are shown in Table 1.

Table 1

| No. | | Composition (%) | | | | | |
|---|---|---|---|---|---|---|---|
| | | PET* | Glass fiber | Inorganic filler | | Organic crystallization promoting agent | |
| | | | | Talc | Ca silicate | Kind** | Amount |
| 1 | Blank | 100 | — | — | — | — | — |
| 2 | Comparative example | 85 | 15 | — | — | — | — |
| 3 | " | 99 | — | 1 | — | — | — |
| 4 | " | 78 | — | 20 | 2 | — | — |
| 5 | " | 78 | 5 | 20 | 2 | — | — |
| 6 | Invention | 96 | — | — | — | Denacol EX-821 | 4 |
| 7 | " | 81 | 15 | — | — | " | 4 |
| 8 | " | 74 | — | 20 | 2 | " | 4 |
| 9 | " | 69 | 5 | 20 | 2 | " | 4 |
| 10 | Comparative example | 98 | — | — | — | Ca-stearate | 2 |
| 11 | " | 96 | — | — | — | EG. DGE | 4 |
| 12 | " | 81 | 15 | — | — | " | 4 |
| 13 | " | 69 | 5 | 20 | 2 | " | 4 |

**Denacol EX-821 (Nagase & Co.; Polyethylene glycol (EO 4 mol) diglycidyl ether)EG.DGE = Ethylene glycol diglycidyl ether
**PET = Polyethylene terephtalate

| | Characteristics of molded articles | | | | |
|---|---|---|---|---|---|
| No. | Mold releasability | Surface characteristics | Deflection temperature (°C.) | δ 120 (mm) | Thermal shrinkage at 160° C. (%) |
| 1 | xx | completely non-crystalline | 65 | — | 1.40 |
| 2 | xx | almost completely non-crystalline | 186 | 0.20 | 0.89 |
| 3 | xx | almost completely non-crystalline | 67 | — | 1.02 |
| 4 | xx | x | 89 | — | 0.66 |
| 5 | xx | x | 192 | 0.28 | 0.88 |
| 6 | Δ | x — Δ | 67 | — | 0.70 |
| 7 | Δ | Δ | 190 | 0.10 | 0.52 |
| 8 | ○ | ○ | 105 | — | 0.48 |
| 9 | ○~◎ | ○ | 205 | 0.08 | 0.28 |
| 10 | xx | almost completely non-crystalline | 66 | — | 1.35 |
| 11 | x | streaks | 67 | — | — |
| 12 | x | x | 186 | 0.18 | 0.78 |
| 13 | Δ | Δ | 201 | 0.10 | 0.80 |

As apparent from Table 1, the compositions of the present invention containing polyethylene glycol diglycidyl ether gave an excellent crystallization promoting effect even in the low-temperature molds and could greatly improve the thermal shrinkage at high temperature of the low-temperature molded articles. When glass fiber was added to this composition, it was possible to improve the surface characteristics and dimensional stability under heat, and in addition markedly elevated the deflection temperature. When the inorganic filler was added in place of the glass fiber, the mold releasability and surface characteristics were markedly improved by a synergetic effect caused together with polyethylene glycol diglycidyl ether. Furthermore, when both glass fiber and inorganic filler were added, the mold releasability, surface characteristics, deflection temperature and dimensional stability under heat were improved to a further extent, so that this composition is very useful as a heat-resisting engineering plastic.

glycol had an increased water absorption of molded articles, but the compositions of the present invention containing the particular organic crystallization promoting agents showed no substantial change in water absorption.

Table 2

| | | Composition (%) | | | | |
|---|---|---|---|---|---|---|
| | | | Glass | Inorganic filler | | Organic crystallization promoting agent |
| No. | | PET | fiber | Talc | Ca silicate | Kind* | Amount |
| 14 | Invention | 68 | 6 | 20 | 2 | PEG (MW 200) DGE | 4 |
| 15 | " | 68 | 6 | 20 | 2 | PEG (MW 400) DGE | 4 |
| 16 | " | 68 | 6 | 20 | 2 | PEG (MW 600) DGE | 4 |
| 17 | " | 68 | 6 | 20 | 2 | PPG (MW 650) DGE | 4 |
| 18 | " | 68 | 6 | 20 | 2 | PPG (MW 1000) DGE | 4 |
| 19 | Comparative example | 67 | 6 | 20 | 2 | PEG (MW 4000) | 5 |
| 20 | " | 67 | 6 | 20 | 2 | PEG (MW 20,000) | 5 |
| 21 | " | 68 | 6 | 20 | 2 | EG. DGE | 4 |
| 22 | " | 70 | 6 | 20 | 2 | Ca stearate | 2 |
| 23 | " | 68 | 6 | 20 | 2 | Terminal-modified PE (MW = 5000) | 4 |
| 24 | Blank | 72 | 6 | 20 | 2 | — | — |

*PEG = Polyethylene glycol
DGE = Diglycidyl ether
PPG = Polypropylene glycol
EG = Ethylene glycol

| | Characteristics of molded articles | | | | |
|---|---|---|---|---|---|
| No. | Mold releasability | Surface characteristics | Deflection temperature (°C.) | δ 120 (mm) | Thermal shrinkage at 150° C. (%) |
| 14 | ○ | ○ | 205 | 0.08 | 0.15 |
| 15 | ⊚ | ⊚ | 205 | 0.075 | 0.14 |
| 16 | ⊚ | ⊚ | 205 | 0.08 | 0.17 |
| 17 | ⊚ | ⊚ | 205 | 0.085 | 0.17 |
| 18 | ○ | ○ | 205 | 0.085 | 0.17 |
| 19 | Δ | Δ | 205 | 0.085 | 0.16 |
| 20 | XX | X | — | 0.22 | — |
| 21 | Δ | Δ | 205 | 0.09 | 0.17 |
| 22 | X | X | — | 0.21 | — |
| 23 | XX | X | — | 0.22 | — |
| | X | X | 198 | 0.22 | 0.21 |

EXAMPLE 2

Polyethylene terephthalate, talc having an average particle diameter of 10μ (Talcum Powder PK, Hayashi Kasei Co.), calcium silicate having an average particle diameter of 50 mμ (Silmos T, Shiraishi Calcium Co.), chopped glass strands having a length of 3 mm (Glasslon chopped strands 486 A, Asahi Fiber Glass Co.), and organic crystallization promoting agents were mixed in the proportions as shown in Table 2, and the mixture was molded into test pieces as in Example 1.

The molded articles thus obtained were measured for the mold releasability, surface characteristics, deflection temperature, deflection amount at 120° C. (δ120), and percent thermal shrinkage after treating at 150° C. for one hour to obtain the results in Table 2.

As apparent from Table 2, the compositions of the present invention containing polyalkylene glycol diglycidyl ethers gave excellent mold releasability and surface characteristics and small deformation amounts under heat. On the other hand, all the comparative example compositions containing polyethylene glycol, ethylene glycol glycidyl ether or wax showed that their improvement in mold releasability and surface characteristics was insufficient or bad on the contrary, and those having poor mold releasability, etc. showed a large deflection amount under heat. The compositions of the comparative examples containing polyethylene

EXAMPLE 3

In the same manner as in Example 1, test pieces were molded from a composition consisting of 69% polyethylene terephthalate, 20% talc having an average particle diameter of 10μ (Talcum Powder PK), 2% calcium silicate having an average particle diameter of 50 mμ (Silmos T), 6% chopped glass strands (Glasslon Chopped Strands 485 A), and 3% polyethylene glycol (MW 600) diglycidyl ether (Denacol EX-841, Nagase & Co.). Also, test pieces were molded, to which the mold releasing agents shown in Table 3 were dry-blended upon molding.

The molded articles thus obtained were measured for the mold releasability, surface characteristics and deflection amount at 120° C. (δ120) to obtain the results in Table 3.

Table 3

| | Releasing agent | | Characteristics of molded articles | | |
|---|---|---|---|---|---|
| No. | Kind | Amount (PHR*2) | Mold releasability | Surface Characteristics | 120 (mm) |
| 25 | — | — | ○ | ○ | 0.085 |
| 26 | Na stearate | 0.5 | ⊚ | ⊚ | 0.075 |
| 27 | Wax OP*1 | 0.8 | ⊚ | ⊚ | 0.075 |

*1Calcium montanate (Hoechst Japan)
*2Weight parts per 100 weight parts of resin As apparent from Table 3, the releasing agents further improved the mold releasability and surface characteristics.

EXAMPLE 4

Polyethylene terephthalate, talc having an average particle diameter of 10μ (Talcum Powder PK), calcium silicate having an average particle diameter of 50 mμ (Silmos T), chopped glass strands having a length of 3 mm (Glasslon Chopped Strands 486 A) and various organic crystallization promoting agent were mixed in the proportions shown in Table 4, and test pieces were molded at a mold temperature of 85° or 90° C. in the same manner as in Example 1.

The surface layer crystallinity of the molded articles thus obtained were measured from the crystal absorption bands of the IR spectrum to obtain the results in Table 4.

As apparent from Table 4, the compositions containing polyalkylene glycol diglycidyl ether showed a great surface-layer crystallinity and gave molded articles of excellent luster. Also, the difference between polyalkylene glycol diglycidyl ether and ethylene glycol diglycidyl ether was remarkable, showing that the polyalkylene glycol diglycidyl ethers in the present invention were excellent crystallization promoting agents.

EXAMPLE 5

Polyethylene terephthalate, talc, calcium silicate, and glass fiber used in Example 4 and the organic crystallization promoting agents shown in Table 5 were mixed in the proportions shown in Table 5, and the mixture was molded into test pieces at a mold temperature of 85° C. in the same manner as in Example 1.

The physical properties of the molded articles thus obtained were evaluated to obtain the results in Table 5.

Table 4

| No. | | Composition (%) | | | | | | Characteristics of molded articles | |
|---|---|---|---|---|---|---|---|---|---|
| | | PET | Glass fiber | Talc | Calcium silicate | Org. cryst. promoter Kind* | % | Mold temp. (°C.) | Surface characteristics | Surface layer crystallinity from IR |
| 28 | Inv. | 68 | 6 | 20 | 2 | EX-821 | 4 | 85 | ○ ~ ◎ | 0.717 |
| 29 | " | 68 | 6 | 20 | 2 | EX-931 | 4 | 85 | ○ | 0.601 |
| 30 | Comp. Ex. | 68 | 6 | 20 | 2 | ED-503 | 4 | 85 | Δ | 0.540 |
| 31 | " | 68 | 6 | 20 | 2 | EX-810 | 4 | 85 | X ~ Δ | 0.460 |
| 32 | " | 68 | 6 | 20 | 2 | NER-100 | 4 | 85 | X ~ Δ | 0.340 |
| 33 | Blank | 72 | 6 | 20 | 2 | — | — | 85 | XX | 0.150 |
| 34 | Inv. | 96 | — | 1 | — | EX-821 | 3 | 90 | Δ | 0.421 |
| 35 | Comp. Ex. | 96 | — | 1 | — | ED-503 | 3 | 90 | X | 0.352 |
| 36 | " | 96 | — | 1 | — | NER-100 | 3 | 90 | X | 0.270 |
| 37 | Blank | 99 | — | 1 | — | — | — | 90 | X | 0.140 |

*EX-821 = Denacol EX-821, PEG(EO 4 mol)DGE, Nagase & Co.
EX-931 = Denacol EX-981, PPG(PO 11 mol)DGE, Nagase & Co.
ED-503 = Adeka Glycilol ED-503, EG.DGE, Asahi Denka Kogyo Co.
EX-810 = Denacol EX-810, PG.DGE, Nagase & Co.
NER-100 = Glycerin diglycidyl ether, Nagase & Co.

Table 5

| | | | Composition | | | | | |
|---|---|---|---|---|---|---|---|---|
| No. | | PET | Org. cryst. promoter Kind | % | Mold releasing agent (reaction catalyst) Kind | PHR | Inorg. filler (%) Talc | Ca silicate | Glass fiber |
| 38 | Comp. Ex. | 100 | — | — | — | — | — | — | — |
| 39 | " | 78 | — | — | — | — | 20 | 2 | — |
| 40 | " | 72 | — | — | — | — | 20 | 2 | 6 |
| 41 | " | 72 | — | — | Na stearate | 1 | 20 | 2 | 6 |
| 42 | " | 68 | PEG[1] MW 4000 | 3 | — | — | 20 | 2 | 6 |
| 43 | " | 68 | ED-503[2] | 3 | — | — | 20 | 2 | 6 |
| 44 | Invention | 69 | PEG.DGE[3] | 3 | — | — | 20 | 2 | 6 |
| 45 | " | 69 | " | 3 | Ca stearate | 0.5 | 20 | 2 | 6 |
| 46 | " | 69 | " | 3 | Na stearate | 0.5 | 20 | 2 | 6 |
| 47 | " | 75 | " | 3 | Ca stearate | 0.5 | 20 | 2 | — |
| 48 | Comp. Ex. | 67 | ED-503 | 4 | Na stearate | 0.5 | 20 | 2 | 6 |

[1]Polyethylene glycol
[2]Refer to * in Table 4
[3]Polyethylene glycol (MW 600)diglycidyl ether

| | Characteristics of molded articles | | | | | | |
|---|---|---|---|---|---|---|---|
| No. | Mold releasability | Surface characteristics | IR surface-layer crystallinity | Deflection temp. (°C.) | δ 120 (mm) | Thermal shrinkage at 150° C. (%) | Water absorption (%) |
| 38 | xx | xx | 0.14 | 65 | — | 1.21 | — |
| 39 | xx | x | 0.15 | 89 | — | 0.50 | — |
| 40 | x | x | 0.15 | 198 | 0.22 | 0.21 | 0.146 |
| 41 | x | x | 0.19 | — | — | — | — |
| 42 | x - Δ | x - Δ | 0.43 | 200 | 0.10 | 0.18 | 0.270 |
| 43 | x - Δ | x - Δ | 0.46 | 201 | 0.09 | 0.17 | 0.145 |
| 44 | Δ - ○ | Δ | 0.58 | 205 | 0.08 | 0.16 | 0.145 |
| 45 | ◎ | ◎ | 0.86 | 205 | 0.07 | 0.14 | 0.135 |

Table 5-continued

| 46 | ◎ | ◎ | 0.75 | 205 | 0.075 | 0.15 | — |
| 47 | ◎ | ◎ | 0.85 | 108 | — | 0.38 | 0.145 |
| 48 | | | Impossible to mold (partially gelled) | | | | |

As apparent from Table 5, the compositions containing polyethylene glycol diglycidyl ether showed a great value of surface-layer crystallinity and also gave excellent molded articles with luster. Also, said compositions had a small water absorption and gave molded articles having excellent heat resistance. On the other hand, the compositons of comparative examples containing polyethylene glycol were not only inferior in moldability and physical properties, but also had a high water absorption, showing their unsuitableness as a molding material for electric parts. The composition of the comparative example containing ethylene glycol diglycidyl ether was poor in moldability.

EXAMPLE 6

Polyethylene terephthalate, talc and glass fiber used in Example 4 and the organic crystallization promoting agents and polyester elastic resin shown in Table 6 were mixed in the proportions shown in the same table, and the mixture was molded into test pieces at a mold temperature of 85° C. in the same manner as in Example 1. The elastic resin was a block copolymer of polybutylene terephthalate/polytetramethylene glycol (polytetramethylene glycol MW 2000, butylene terephthalate:polyether=4:1 mol, $T_g$=about −58° C., MW=about 45,000). The physical properties of the molded articles thus obtained were evaluated to obtain the results in Table 6.

Table 6

| | | Composition (%) | | | | | Characteristics of molded articles | | | |
|---|---|---|---|---|---|---|---|---|---|---|
| No. | | PET | Glass fiber | Talc | Org. cryst. promoter | | Polyester elastic resin | Mold releasability | Surface characteristics | Deflection temp. (°C.) | Shrinkage at 160° C. (%) |
| 49 | Comp. Ex. | 64 | 6 | 20 | — | | 10 | xx | x | — | — |
| 50 | " | 63.95 | 6 | 20 | EX-841[1] | 0.05 | 10 | xx | x | — | — |
| 51 | Inv. | 63.5 | 6 | 20 | " | 0.5 | 10 | △−◎ | △ | — | — |
| 52 | " | 66 | 6 | 20 | " | 2 | 5 | ◎−◎ | ◎ | 191 | — |
| 53 | " | 68 | 6 | 20 | " | 4 | 2 | ◎ | ◎ | 202 | 0.30 |
| 54 | " | 67 | 6 | 20 | " | 3 | 4 | ◎ | ◎ | 195 | — |
| 55 | " | 61 | 6 | 20 | " | 3 | 10 | ◎ | ◎ | 164 | — |
| 56 | " | 56 | 6 | 20 | " | 3 | 15 | ◎ | ◎ | 120 | — |
| 57 | Comp. Ex. | 74 | 6 | 20 | — | — | — | xx | Nearly completely non-crystalline | 192 | 0.35 |
| 58 | Comp. Ex. | 67 | 6 | 20 | ED-503[2] | 3 | 4 | x | x − △ | 190 | — |
| 59 | Blank | 100 | — | — | — | — | — | xx | Completely non-crystalline | 65 | 1.50 |

[1]Nagase & Co., Polyethylene glycol (MW 600) diglycidyl ether
[2]Asahi Denka Kogyo Co., Ethylene glycol diglycidyl ether As apparent from Table 6, by a synergetic effect caused by the combined use of the polyester elastic resin and the particular organic crystallization promoting agent, molded articles having very good moldability and excellent heat resistance were obtained with a relatively small amount of said promoting agents and by low-temperature molding. The addition of too large an amount of the elastic resin caused a disadvantage of lowering the deflection temperature. When a small amount of a mold releasing agent was added, excellent moldability was obtained with a small amount of the organic crystallization promoting agent.

EXAMPLE 7

Polyethylene terephthalate, talc and glass fiber used in Example 4 and the organic crystallization promoting agents and olefinic elastic resins shown in Table 7 were mixed beforehand in the proportions shown in the same table. The mixture was then put into the hopper of a 40 mm diameter 2-vent extruder and was molten and kneaded at cylinder temperatures of 250°–275° C. to obtain compound chips. Using the compound chips, test pieces were molded at a mold temperature of 90° C. in the same manner as in Example 1. The moldability and physical properties of the molded articles were evaluated and are shown in Table 7.

Table 7

| | | Composition (parts) | | | | | | | |
|---|---|---|---|---|---|---|---|---|---|
| No. | | PET | Olefinic elastic resin | | Org. cryst. promoter | | Catalyst | (PHR*) | Glass fiber | Talc |
| 60 | Comp. Ex. | 74 | — | | — | | — | | 6 | 20 |
| 61 | " | 64 | Ethylene/propylene copolymer[2] | 10 | — | | — | | 6 | 20 |
| 62 | Inv. | 71 | — | | Denacol 841[3] | 3 | — | | 6 | 20 |
| 63 | " | 66 | Ethylene/propylene copolymer | 5 | " | 3 | — | | 6 | 20 |
| 64 | " | 61 | Ethylene/proplene copolymer | 10 | " | 3 | — | | 6 | 20 |
| 65 | " | 66 | Ethylene/methyl acrylate copolymer[4] | 5 | " | 3 | — | | 6 | 20 |
| 66 | " | 61 | Ethylene/methyl acrylate copolymer[4] | 10 | " | 3 | — | | 6 | 20 |
| 67 | " | 66 | Ethylene/vinyl | | | | | | | |

Table 7-continued

| | | | | | | | | | | |
|---|---|---|---|---|---|---|---|---|---|---|
| | | | acetate copolymer[5] | 5 | " | 3 | — | | 6 | 20 |
| 68 | " | 61 | Ethylene/vinyl acetate copolymer[5] | 10 | " | 3 | — | | 6 | 20 |
| 69 | " | 66 | Epoxy-modified ethylene/vinyl acetate copolymer[6] | 5 | " | 3 | — | | 6 | 20 |
| 70 | " | 61 | Epoxy-modified ethylene/vinyl acetate copolymer[6] | 10 | " | 3 | — | | 6 | 20 |
| 71 | " | 66 | Epoxy-modified ethylene/vinyl acetate copolmer[6] | 5 | " | 3 | Na stearate | 0.3 | 6 | 20 |
| 72 | " | 63 | Ethylene/propylene copolymer[2] | 10 | " | 1 | — | | 6 | 20 |
| 73 | " | 60 | Ethylene/propylene copolymer[2] | 10 | " | 4 | — | | 6 | 20 |
| 74 | " | 61 | Ethylene/propylene copolymer[2] | 10 | " | 3 | Na stearate | 0.3 | 6 | 20 |
| 75 | Comp. Ex. | 61 | Ethylene/propylene copolymer[2] | 10 | ED-503[7] | 3 | — | | 6 | 20 |

| | Physical properties of molded articles | | | | | | |
|---|---|---|---|---|---|---|---|
| | Moldability | | Tensile | Tesile | Flexural | Weight dropping | Deflection |
| No. | Releas-ability | Surface char. | strength (kg/mm$^2$) | elongation (%) | modulus (kg/mm$^2$) | impact strength (kg . cm) | amount (mm) |
| 60 | x | x | 5.81 | 1.07 | 700 | 0.75 | 0.25 |
| 61 | xx | xx | 5.63 | 1.52 | 525 | 1.50 | 0.35 |
| 62 | ⊚ | ⊚ | 6.18 | 1.39 | 683 | 0.75 | — |
| 63 | ○ | ⊚ | 6.30 | 1.47 | 616 | 2.25 | — |
| 64 | ○ | ⊚ | 5.84 | 1.78 | 524 | 1.50 | 0.12 |
| 65 | ○ | ⊚ | 6.25 | 2.08 | 545 | 2.25 | — |
| 66 | ○ | ⊚ | 5.21 | 3.11 | 403 | 3.75 | — |
| 67 | ○ | ⊚ | 6.86 | 1.74 | 642 | 1.50 | — |
| 68 | ○ | ○ | 6.11 | 1.83 | 607 | 1.50 | — |
| 69 | ⊚ | ○ | 7.10 | 1.78 | 603 | 2.25 | 0.09 |
| 70 | ⊚ | ⊚ | 6.68 | 2.27 | 503 | 1.75 | 0.09 |
| 71 | ⊚ | ⊚ | 7.25 | 1.75 | 625 | 2.50 | 0.07 |
| 72 | ○ | △ | 5.88 | 1.80 | 530 | 1.50 | — |
| 73 | ⊚ | ⊚ | 5.93 | 1.98 | 520 | 2.25 | — |
| 74 | ⊚ | ⊚ | 5.87 | 1.88 | 520 | 2.50 | — |
| 75 | x | x | 5.65 | 1.50 | 525 | 1.50 | — |

[1] Addition amount (parts) per 100 parts of the total composition except catalyst.
[2] Ethylene component = 70%, $T_g$ = about −60° C., melt index at 230° C. = 9.0
[3] Nagase & Co., polyethylene glycol (MW 600) diglycidyl ether.
[4] Ethylene component = 67%, $T_g$ = below −20° C., melt index at 230° C. = 2.0
[5] Ethylene component = 55%, $T_g$ = about −20° C., melt index at 230° C. = 60
[6] A product formed by graft-polymerization of glycidyl methacrylate to the above-mentioned copolymer[5] in the presence of a dicumyl peroxide, thus introducing epoxy groups of about 3000 epoxy equivalent.
[7] Nagase & Co., ethylene glycol diglycidyl ether As apparent from Table 7, when an olefinic polymer was added, the moldability become bad. But the organic crystallization promoting agents were effective even to such compositions and gave excellent moldability. By the combined use of the organic crystallization promoting agents, the dispersibility of the olefinic polymers into the polyester and the interfacial adhesive force between the two polymers were improved, so that the toughness could be improved.

EXAMPLE 8

Polyethylene terephthalate, talc and glass fiber used in Example 4 and the organic crystallization promoting agents, flame retardants and antimony trioxide (Nippon Seiko Co.) shown in Table 8 were mixed in the proportions shown in the same table. The mixture was molded at a mold temperature of 85° C. to form discs, 3 mm in thickness, and test pieces, 1/16"(thickness)×½"-(width)×5"(length) or ⅛"×½"×5" in size. The physical properties of the molded articles thus obtained were evaluated and the results are shown in Table 8.

The flame retardants were synthesized by the following methods:

SYNTHESIS OF TETRABROMOBISPHENOL A CARBONIC ESTER OLIGOMER (FLAME RETARDANT A)

To 544 parts of tetrabromobisphenol A and 24 parts of p-tert-butylphenol, 3000 parts of 10% sodium hydroxide and 2000 part of methylene chloride were added to form a solution. While maintaining the temperature at 25±5° C. and the pH at about 12, about 300 parts of phosgen gas was blown through the solution. After the termination of blowing, 2.5 ml 8% triethyl amine was added as a catalyst, and the reaction mixture was allowed to react at 20°–30° C. for two hours. After the completion of the reaction, the methylene chloride layer was separated. After sufficient washing with water, it was poured into methanol which was ten times in weight, to precipitate the reaction product. The precipitate was then filtered and dried to obtain the product in the form of a white powder. The aromatic polycarbonate thus obtained had a number of repeating units of about 14 on the average, a softening point of about 260° C. and a bromine content of 53.6%.

SYNTHESIS OF CYANURIC ACID ESTER ric acid ester in the form of a white powder (bromine content about 60%, molecular weight about 33,000).

Table 8

| | | Composition (%) | | | | | | |
|---|---|---|---|---|---|---|---|---|
| | | | Flame | | | Glass | Organic crystallization promoting agent | |
| No. | | PET | retardant | | $Sb_2O_3$ | Talc | fiber | Kind | amount |
| 76 | Blank | 100 | — | | — | — | — | — | — |
| 77 | Comparative example | 74 | — | | — | 20 | 6 | — | — |
| 78 | " | 80 | A | 8 | 2 | 3 | 7 | — | — |
| 79 | " | 73 | A | 8 | 2 | 10 | 7 | — | — |
| 80 | " | 63 | A | 8 | 2 | 20 | 7 | — | — |
| 81 | Invention | 68 | A | 23 | 6 | — | — | PEG.DGE[1] | 3 |
| 82 | " | 60 | A | 16 | 4 | 2 | 15 | " | 3 |
| 83 | " | 68.5 | A | 3.5 | 1 | 20 | 7 | " | 3 |
| 84 | " | 59.5 | A | 6 | 1.5 | 2 | 25 | " | 3 |
| 85 | " | 77 | A | 8 | 2 | 3 | 7 | " | 3 |
| 86 | " | 72 | A | 8 | 2 | 8 | 7 | " | 3 |
| 87 | " | 60 | A | 8 | 2 | 20 | 7 | " | 3 |
| 88 | Comparative example | 60 | A | 8 | 2 | 20 | 7 | EG.DGE[2] | 3 |
| 89 | " | 60 | A | 8 | 2 | 20 | 7 | PE[3] | 3 |
| 90 | " | 60 | A | 8 | 2 | 20 | 7 | Ca stearate | 3 |
| 91 | " | 60 | A | 8 | 2 | 20 | 7 | PEG[4] | 3 |
| 92 | " | 61 | B | 10 | 2.5 | 20 | 6.5 | — | — |
| 93 | Invention | 58 | B | 10 | 2.5 | 20 | 6.5 | PEG.DGE[1] | 3 |
| 94 | Comparative example | 58 | B | 10 | 2.5 | 20 | 6.5 | NER-100[5] | 3 |

[1] Polyethylene glycol (MW 400) diglycidyl ether
[2] Ethylene glycol diglycidyl ether
[3] Polyethylene wax (MW 5000)
[4] Polyethylene glycol (MW 4000)
[5] Glycerin diglycidyl ether (Nagase & Co.)

| | | | Characteristics of molded articles | | | |
|---|---|---|---|---|---|---|
| No. | Mold releas- ability | Surface characteristics | Flame retardancy test | | Deflection temperature (°C.) | Thermal shrinkage at 150° C. (%) |
| | | | 1/16" thick | ⅛" thick | | |
| 76 | xx | xx | Failed | Failed | 65 | 1.22 |
| 77 | xx | xx | " | " | 87 | — |
| 78 | xx | xx | " | " | 124 | — |
| 79 | xx | xx | Passed | — | 133 | — |
| 80 | xx | xx | " | — | 140 | 0.60 |
| 81 | Δ | Δ | " | — | 112 | — |
| 82 | Δ-○ | Δ | " | — | 179 | — |
| 83 | ○ | ○ | Failed | Passed | 209 | — |
| 84 | ○ | ○ | " | " | 225 | — |
| 85 | Δ-○ | Δ | " | " | 152 | — |
| 86 | ○ | ○ | Passed | — | 175 | — |
| 87 | ○ | ○ | " | — | 208 | 0.15 |
| 88 | x-Δ | x-Δ | " | — | 195 | 0.35 |
| 89 | xx | x | " | — | 177 | 0.50 |
| 90 | x | x | " | — | 165 | 0.50 |
| 91 | x-Δ | x-Δ | " | — | 190 | 0.35 |
| 92 | xx | xx | " | — | 188 | — |
| 93 | ○ | ○ | " | — | 203 | — |
| 94 | x | x | " | — | 193 | — |

OLIGOMER (FLAME RETARDANT B)

27.65 g (0.15 mol) cyanuric chloride, 66.6 g (0.1 mol) tetrabromobisphenol, 82.7 (0.25 mol) tribromophenol and 1.0 g (0.0045 mol) triethylbenzyl ammonium chloride were charged into a one-liter four-mouth flask equipped with a stirrer, thermometer and reflux condenser, and 400 g methylene chloride was added to form a solution. The temperature was cooled to below 20° C. under stirring. While maintaining at this temperature, a solution of 21.0 g (0.525 mol) sodium hydroxide dissolved in 50 g water was slowly added dropwise. After the completion of dropping, the reaction solution was maintained at 25° C. for one hour. The solution was then heated to raise the temperature, and was refluxed for 3 hours.

Subsequently, methylene chloride was distilled off, and the resulting solid was taken out of the flask. It was then filtered, washed with water, dilute acid, water, and finally with methanol, and dried to obtain 140 g cyanuric acid ester in the form of a white powder (bromine content about 60%, molecular weight about 33,000).

As apparent from Table 8, the addition of the organic crystallization promoting agent improved the dispersibility of the flame retardants into the polyester, and gave molded articles having excellent surface characteristics. Incidentally, there was no trouble such as breakage of pellets in pelletizing. Alos, it was possible to improve the reproducibility of flame retarding effect and accordingly to display excellent flame retardancy with a small amount of the flame retardants.

What we claim is:

1. A polyester composition composed of solid polyethylene terephthalate or a solid polyester containing at least 80 mol % ethylene terephthalate repeating units and 0.1 to 15 weight %, based on the polyester, of an organic crystallization promoting agent added thereto having a polyoxyalkylene chain and at least one epoxy group.

2. The polyester composition as claimed in claim 1 wherein the amount of addition of the organic crystallization promoting agent is from 0.5 to 15 weight % based on the polyester.

3. The polyester composition as claimed in claim 1 wherein the organic crystallization promoting agent is glycidyl ether of a polyalkylene glycol or glycidyl ether of a derivative of a polyalkylene glycol, said polyalkylene glycol or said derivative thereof having a molecular weight less than 5000.

4. The polyester composition as claimed in claim 1 wherein the organic crystallization promoting agent is polyglycidyl ether of a polyalkylene glycol having a molecular weight of from 200 to 1500.

5. The polyester composition as claimed in claim 1 wherein the organic crystallization promoting agent is an epoxy compound represented by the general formula:

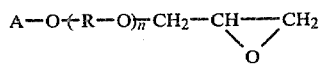

wherein A stands for an aliphatic hydrocarbon group, hydrogen, or a glycidyl group; R stands for an aliphatic hydrocarbon group of $C_2$-$C_5$, and n stands for an integer not less than 2.

6. A polyester composition composed of solid polyethylene terephthalate or a solid polyester containing at least 80 mol % ethylene terephthalate repeating units, to which are added (a) 0.1 to 15 weight %, based on the polyester, of an organic crystallization promoting agent containing a polyoxyalkylene chain and at least one expoxyl group, and (b) less than 40 weight %, based on the total composition, of an inorganic filler having a particular diameter less than 30μ.

7. The polyester composition as claimed in claim 6 wherein the amount of the inorganic filler is 1 to 30 weight % based on the total composition.

8. The polyester composition as claimed in claim 6 wherein the inorganic filler is a silicate.

9. A polyester composition composed of solid polyethlene terephthalate or a solid polyester containing at least 80 mol % ethylene terephthalate repeating units, to which are added (a) 0.1 to 15 weight %, based on the polyester, of an organic crystallization promoting agent containing a polyoxyalkylene chain and at least one epoxy group, and (b) less than 20 weight %, based on the polyester, of an elastic substance of the polyester family having a glass transition temperature lower than 10° C.

10. The polyester composition as claimed in claim 9 wherein the amount of addition of the elastic substance of the polyester family is 1 to 10 weight % based on the polyester.

11. A polyester composition composed of solid polyethylene terephthalate or a solid polyester containing at least 80 mol % ethylene terephthalate repeating units, to which are added (a) 0.1 to 15 weight %, based on the polyester, of an organic crystallization promoting agent containing a polyoxyalkylene chain and at least one epoxy group, and (b) less than 10 weight %, based on the polyester, of a mold releasing agent.

12. The polyester composition as claimed in claim 11 wherein the mold releasing agent is at least one compound selected from the group consisting of an ester of an aliphatic acid of $C_{15}$-$C_{50}$ and an alcohol, a salt of said aliphatic acid and a metal of IA Group or IIA Group of the Periodic Table of the Elements.

13. A polyester composition composed of solid polyethylene terephthalate or a solid polyester containing at least 80 mol % ethylene terephthalate repeating units, to which are added (a) 0.5 to 15 weight %, based on the polyester, of an organic crystallization promoting agent containing a polyoxylalkylene chain and at least one epoxy group, (b) 0 to 20 weight %, based on the polyester, of an elastic substance of the polyester family having a glass transition temperature lower than 10° C., (c) 0 to 10 weight %, based on the polyester, of a mold releasing agent, (d) 0 to 40 weight %, based on the total composition, of an inorganic filler having a particle diameter less than 30μ, and (e) 0 to 50 weight %, based on the total resin component, of a fibrous reinforcing material.

14. The polyester composition as claimed in claim 13 wherein the fibrous reinforcing material is glass fiber.

15. The polyester composition as claimed in claim 13 wherein the surface crystallinity of a molded article formed by injection molding at a mold temperature of 85° to 90° C. is at least 0.5.

16. Polyester molded articles obtained by injection molding or compression molding the polyester composition as claimed in claim 13.

* * * * *